(12) United States Patent          (10) Patent No.:     US 12,295,512 B1
     Qi                             (45) Date of Patent:           May 13, 2025

(54) RETRACTABLE GREENING FRAME

(71) Applicant: ZHEJIANG RUOPEI ARTS&CRAFTS CO., LTD., Lanxi (CN)

(72) Inventor: Quanshui Qi, Shangluo (CN)

(73) Assignee: ZHEJIANG RUOPEI ARTS&CRAFTSCO., LTD., Lanxi (CN)

( * ) Notice: Subject to any disclaimer, the term of this patent is extended or adjusted under 35 U.S.C. 154(b) by 0 days.

(21) Appl. No.: 18/769,447

(22) Filed: Jul. 11, 2024

(30) Foreign Application Priority Data

May 27, 2024 (CN) .......................... 202421185360.9

(51) Int. Cl.
    A47G 7/02          (2006.01)
(52) U.S. Cl.
     CPC ...................................... A47G 7/02 (2013.01)
(58) Field of Classification Search
     CPC . F16B 21/08; Y10T 403/32959; A01G 17/04;
                            A01G 17/06; A47G 7/02
     USPC .................... 428/15, 17, 24; 47/41.01, 41.12
     See application file for complete search history.

(56)              References Cited

U.S. PATENT DOCUMENTS 10,098,453 B1 * 10/2018 Xu ........................... E04H 17/00
11,638,493 B2 *  5/2023 Haruna .................... A47G 7/06
                                                            47/41.01

FOREIGN PATENT DOCUMENTS

DE        202006017798 U1 *  3/2007  ............ F16B 21/075

* cited by examiner

Primary Examiner — Kimberly T Wood
(74) Attorney, Agent, or Firm — Hemisphere Law, PLLC; Zhigang Ma

(57)              ABSTRACT

A retractable greening frame includes a connecting component including an upright column and an insertion rod, connecting rods including first directional rods and second directional rods, and a decoration including a decorative component and an installation ring. The upright column is inserted in the insertion rod, one of the first directional rods is hinged to a corresponding second directional rod by the insertion rod, and the upright column passes through the installation ring to hold the installation ring against an end surface of the insertion rod. The decoration is assembled through an insertion process of the upright column and the insertion rod. During transformation, the decoration can be kept separate from the upright column to prevent the assembled greening frame from damage. After arriving at the site, rapid assembly can be achieved by using the insertion.

15 Claims, 4 Drawing Sheets

RETRACTABLE GREENING FRAME

CROSS-REFERENCE TO RELATED APPLICATION

This application claims priority to Chinese Patent Application No. 2024211853609, filed May 27, 2024, which is herein incorporated by reference in its entirety.

TECHNICAL FIELD

The disclosure relates to the field of artificial decorations, and more particularly to a retractable greening frame.

BACKGROUND

At present, some courtyards, gardens, or room partition walls or ceilings are decorated with artificial plants with greening effects on, for aesthetics or to give people a feeling of being in nature.

However, current artificial plants on the market need to be wrapped or tied onto fences, railings or frames on ceilings, making assembly difficult. Although foldable greening frame devices in the related art can reduce on-site wrapping workloads, prefabricated decorations are prone to falling off during transportation, resulting in poor aesthetic appearance of a final product.

SUMMARY

The disclosure provides a retractable greening frame, aiming at solving problem that the prefabricated decorations are prone to falling off during transportation, resulting in poor aesthetic appearance of the final product.

The disclosure is achieved by below solutions: the retractable greening frame includes a connecting component, connecting rods and a decoration.

The connecting component includes an upright column and an insertion rod, and the upright column is inserted in the insertion rod.

The connecting rods includes multiple first directional rods and multiple second directional rods, and one of the first directional rods is hinged to a corresponding second directional rod by the insertion rod.

The decoration includes a decorative component and an installation ring, and the upright column passes through the installation ring to hold the installation ring against an end surface of the insertion rod.

In an embodiment, the upright column includes a limiting end, a column body and a cover plate, the limiting end and the cover plate are disposed at two ends of the column body separately, and the end of the column body provided with the limiting end is inserted in the insertion rod.

In an embodiment, the insertion rod includes a rod body, a bottom plate and a limiter, the rod body defines an insertion hole inside, the bottom plate and the limiter are disposed at two ends of the rod body separately, the end of the rod body provided with the limiter is an insertion end, the upright column is inserted in the insertion rod through the insertion end.

In an embodiment, the end of the upright column provided with the limiting end passes through the installation ring before entering the rod body.

In an embodiment, when the limiting end is snap-fitted with the rod bod, a distance between the cover plate and the end surface of the insertion rod is same as a thickness of the installation ring.

In an embodiment, each of the first directional rods and the second directional rods defines a hole, and the rod body passes through the one first directional rod and the corresponding second directional rod through the holes on the one first directional rod and the corresponding second directional rod respectively. The one first direction rod and the corresponding second direction rod rotate at a part of the rod body between the limiter and the bottom plate.

In an embodiment, the decorative component is an artificial plant.

In an embodiment, an outer diameter of the installation ring is greater than a diameter of the insertion hole.

In an embodiment, a diameter of the cover plate is greater than an outer diameter of the installation ring.

Compared to the related art, the disclosure has following beneficial effects.

1. In the retractable greening frame provided by the disclosure, the decoration is assembled through an insertion process of the upright column and the insertion rod. During transformation, the decoration can be kept separate from the upright column to prevent the assembled greening frame from damage. After arriving at the site, rapid assembly can be achieved by using the insertion.

2. In the retractable greening frame provided by the disclosure, the decoration is connected to the connecting rods through nested assembly, which reduces complexity of an assembly process in a winding structure and difficulty of the assembly process.

Figure 1:
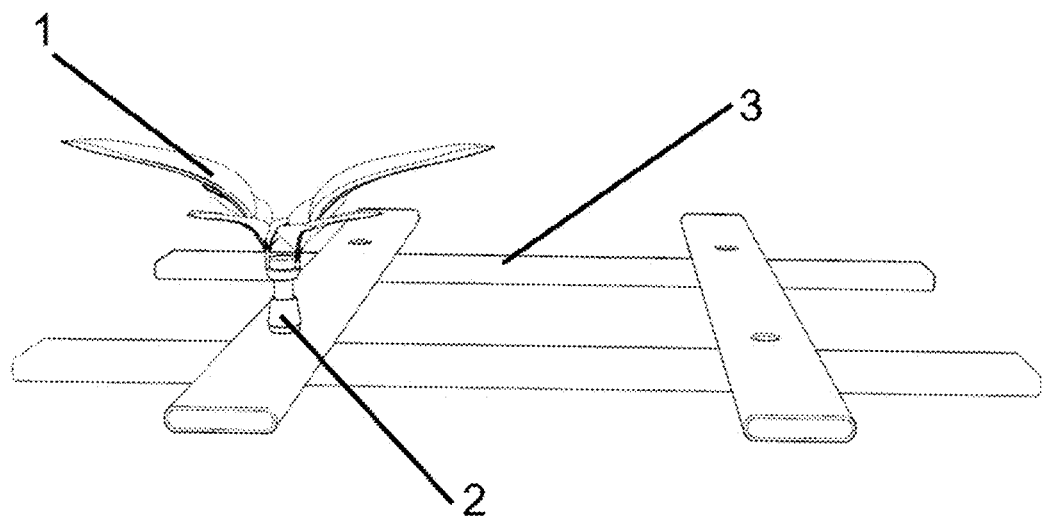
FIG. 1 illustrates a schematic structural diagram of a retractable greening frame of the disclosure.
Figure 2:
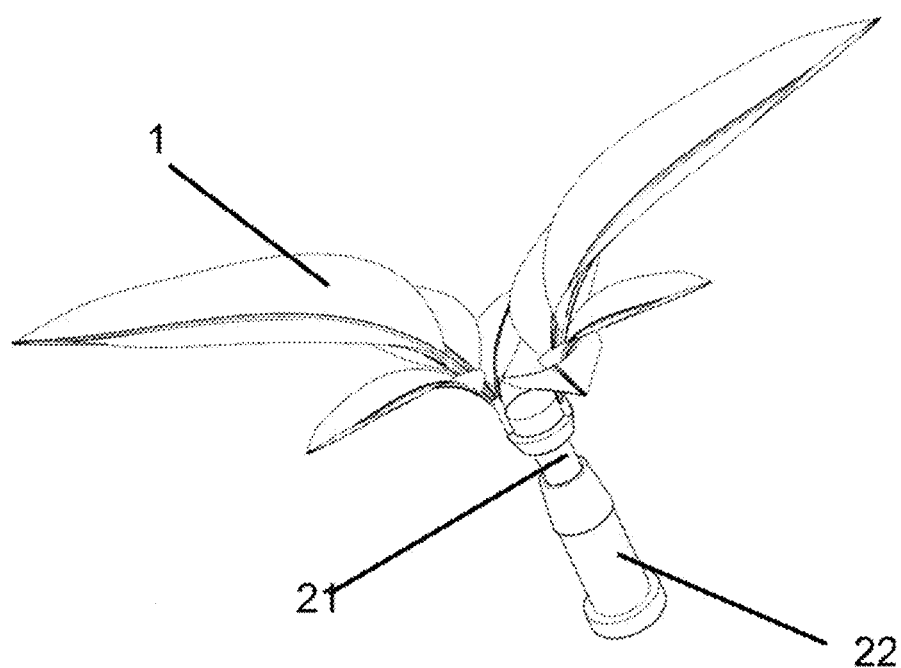
FIG. 2 illustrates a schematic structural diagram of a decoration and a connecting component of the retractable greening frame of the disclosure.
Figure 3:
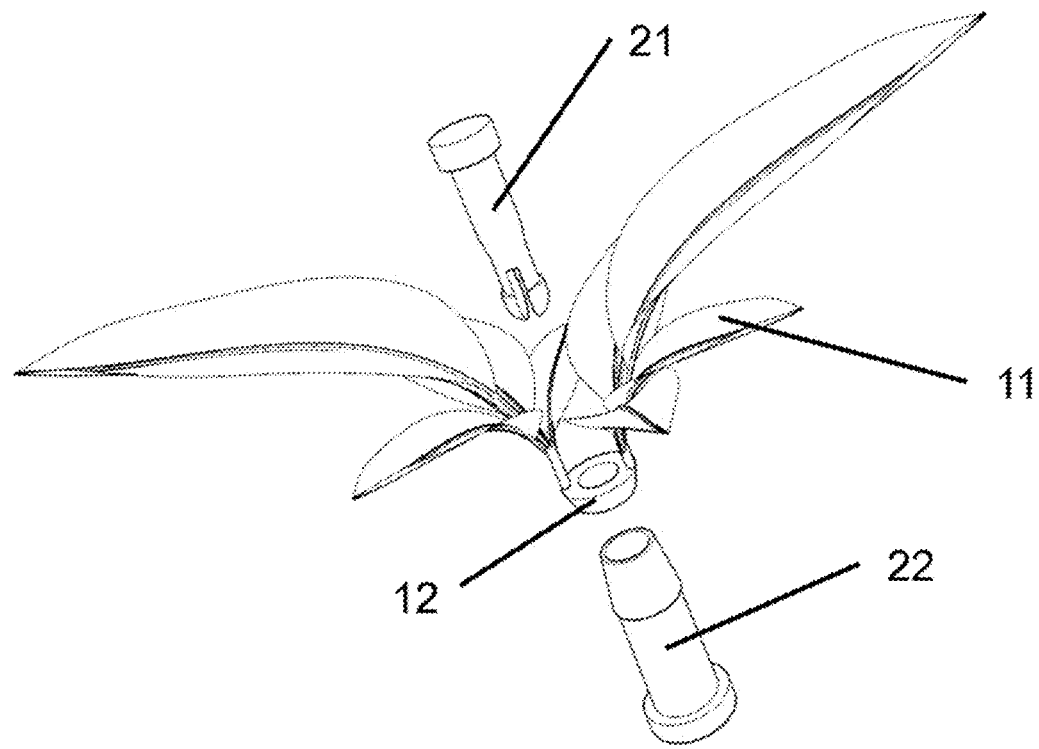
FIG. 3 illustrates an exploded view of the decoration and the connecting component of the retractable greening frame of the disclosure.
Figure 4:
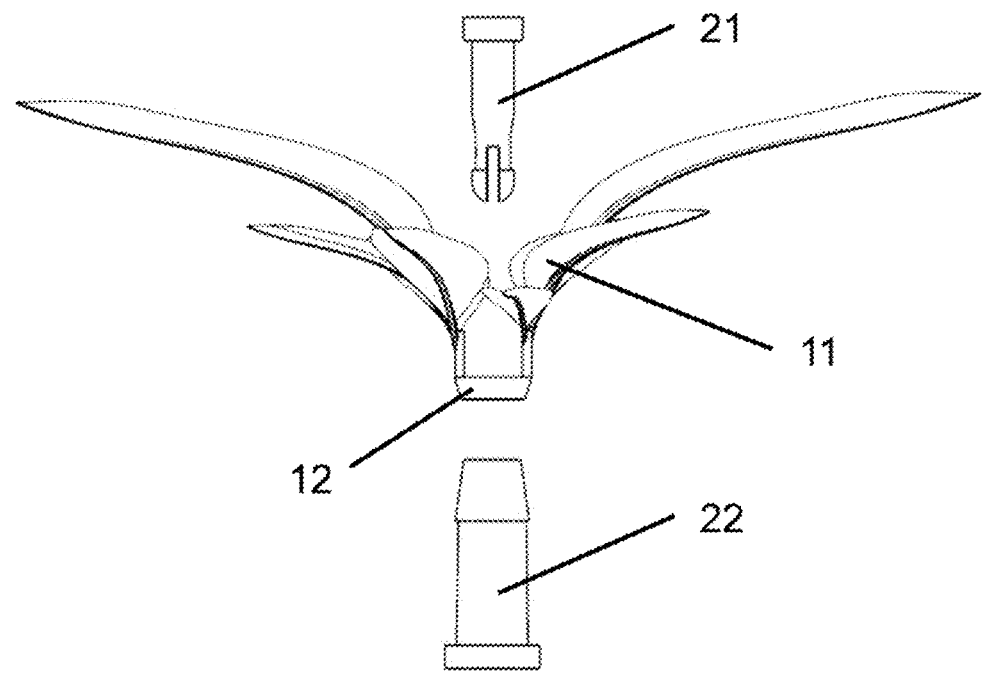
FIG. 4 illustrates a schematic structural diagram of an assembly process of the connecting component of the retractable greening frame of the disclosure.
Figure 5:
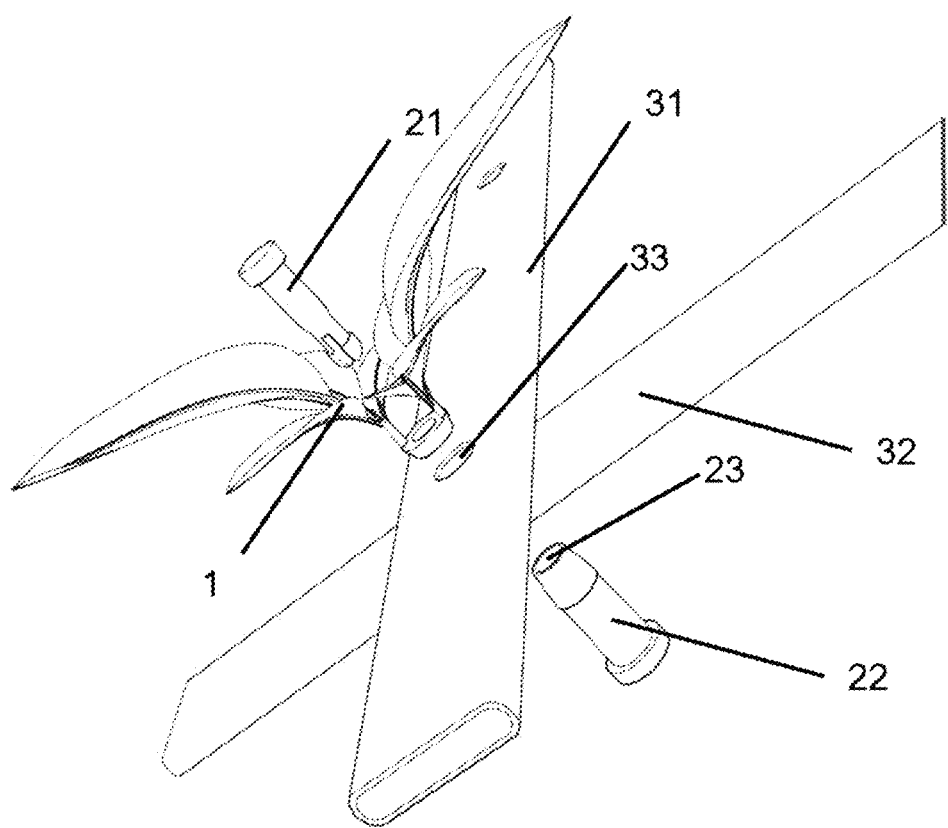
FIG. 5 illustrates a schematic structural diagram of the connecting component and the connecting rods of the retractable greening frame of the disclosure.

Description of reference numerals: 1: decoration; 11: decorative component; 12: installation ring; 2: connecting component; 21: upright column; 211: limiting end; 212: column body; 213: cover plate; 22: insertion rod; 221: rod body; 222: bottom plate; 223: limiter; 23: insertion hole; 3: connecting rod; 31: first directional rod; 32: second directional rod; 33: hole; 34: hole.

DETAILED DESCRIPTION OF EMBODIMENTS

Unless otherwise defined, all technical and scientific terms used in the disclosure have the same meanings as those commonly understood by those skilled in the art; The terms used in the specification are only for the purpose of describing specific embodiments and are not intended to limit the disclosure; The terms "include", "comprise", "have" and any variations thereof in the specification, the claims, and the accompanying drawings of the disclosure are intended to cover non-exclusive inclusion. The terms "first"

and "second", etc. in the specification, the claims and the accompanying drawings of the disclosure are used to distinguish different objects, and not to describe a specific order.

Referring to "embodiments" in the disclosure means that specific features, structures, or characteristic described in conjunction with the embodiments may be included in at least one embodiment of the disclosure. The phrase appearing in various positions in the specification does not necessarily refer to the same embodiment, nor is it an independent or alternative embodiment that is mutually exclusive with other embodiments. Those skilled in the art explicitly and implicitly understand that the embodiments described in the disclosure can be combined with other embodiments.

The disclosure provides a retractable greening frame, referring to FIG. 1 to FIG. 6, the retractable greening frame includes a connecting component 2, connecting rods 3 and a decoration 1.

The connecting component 2 includes an upright column 21 and an insertion rod 22, and the upright column 21 is inserted in the insertion rod 22.

The connecting rods 3 includes multiple first directional rods 31 and multiple second directional rods 32, and one of the first directional rods 31 is hinged to a corresponding second directional rod 32 by the connecting component 2.

The decoration 1 includes a decorative component 11 and an installation ring 12, and the upright column 21 passes through the installation ring 12 to hold the installation ring 12 against an end surface of the insertion rod 22. The decorative component 11 is an artificial plant and connected to the installation ring 12.

In the disclosure, the decoration 1 is assembled through an insertion process of the upright column 21 and the insertion rod 22. During transformation, the decoration 1 can be kept separate from the upright column 21 to prevent the assembled greening frame from damage. The decoration 1 is connected to the connecting rods 3 through nested assembly, which reduces complexity of an assembly process in a winding structure and difficulty of the assembly process.

An outer wall of the insertion rod 22 is provided with a limiter 223 to limit the first directional rod 31 and the corresponding second directional rod 32, thereby fulfilling the requirement for hinge connection between the first directional rod 31 and the corresponding second directional rod 32. An end of the insertion rod 22 defines an insertion hole 23, an inner wall of the insertion rod 22 surrounding the insertion hole 23 is provided with an inner limiter. The upright column 21 passes through the installation ring 12 to hold the installation ring 12 against the end surface of the insertion rod 22 provided with the insertion hole 23. The upright column 21 is snap-fitted with the inner limiter to complete assembly of the decoration 1 and the connecting component 2. The assembly process can be carried out at a layout site.

Preferably, the upright column 21 includes a limiting end 211, a column body 212 and a cover plate 213. The limiting end 211 and the cover plate 213 are disposed at two ends of the column body 212 separately, and the end of the column body 212 provided with the limiting end 211 is inserted in the insertion rod 22.

Figure 6:
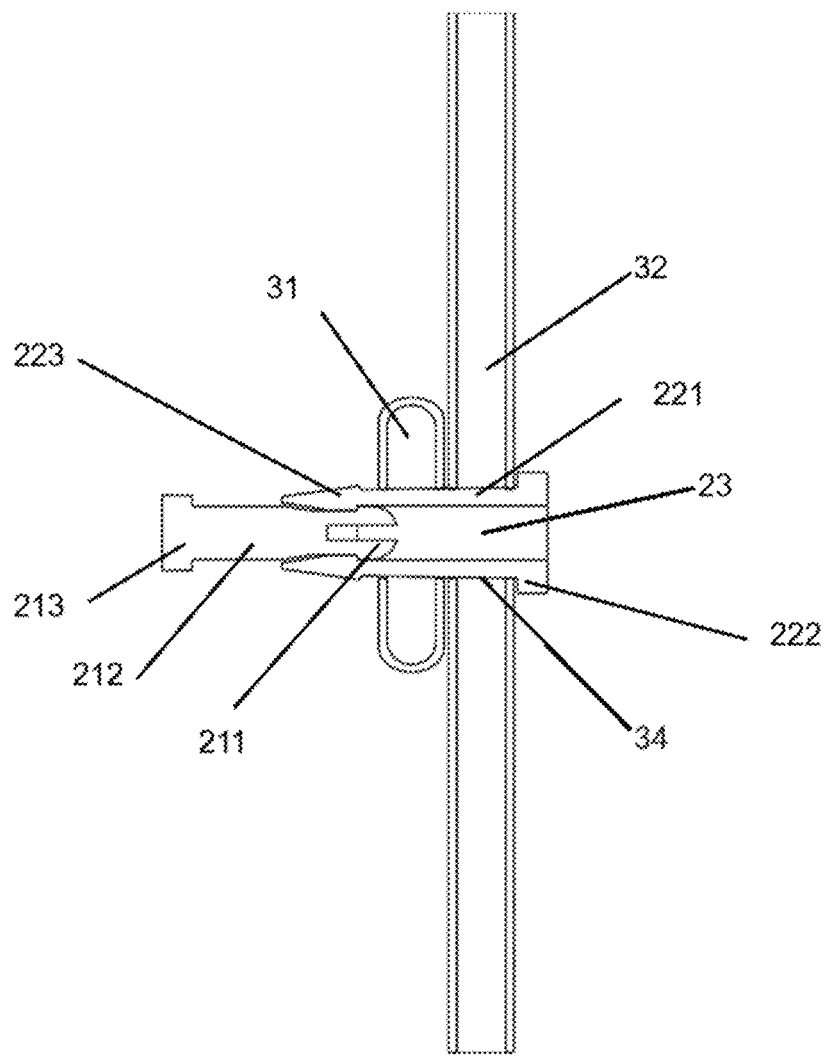
FIG. 6 illustrates a schematic internal structural diagram of the connecting component of the retractable greening frame of the disclosure.

In the embodiment, referring to FIG. 6, the inner limiter is an annular structure that protrudes from the inner wall of the insertion rod 22 surrounding the insertion hole 23. A part of the insertion rod 22 near an entrance of the insertion hole 23 is provided with a sloping structure which is flush with the inner limiter, facilitating the insertion of the limiting end 211. The limiting end 211 is a structure in the related art.

During an insertion process, the limiting end 211 deforms due to the compression by the inner limiter. After a part structure of the limiting end 211 passes through the inner limiter, the limiting end 211 reshapes and snaps onto the inner limiter, completing the limiting function. A diameter of the cover plate 213 is greater than an outer diameter of the installation ring 12, and the end of the upright column 21 provided with the limiting end 211 previously passes through the installation ring 12 during the assembly process. When the limiting end 211 is snap-fitted with the inner limiter, a distance between the cover plate 213 and the end surface of the insertion rod 22 is same as a thickness of the installation ring 12. Therefore, when the limiting end 211 is snap-fitted with the inner limiter, the cover plate 213 holds the installation ring 12 against the end surface of the insertion rod 22 due to the installation ring 12 is nested on a periphery of the column body 212. The outer diameter of the installation ring 12 is greater than a diameter of the insertion hole 23.

Preferably, the insertion rod 22 includes a rod body 221, a bottom plate 222 and the limiter 223, the rod body 221 defines the insertion hole 23 inside and the inner limiter is disposed inside the insertion hole 23. An end of the rod body 221 provided with the limiter 223 is an insertion end, the upright column 21 is inserted in the insertion rod 22 through the insertion end. The bottom plate 222 is disposed at an end of the rod body 221 facing away from the limiter 223, and the limiter 223 is disposed at the end of the rod body 221 facing away from the bottom plate 222. The limiter 223 and the bottom plate 222 play a role to help the hinge connection between the first directional rod 31 and the corresponding second directional rod 32.

Each of the first directional rods 31 and the second directional rods 32 defines a hole. The limiter 223 uses a sloping structure, and the limiter 223 passes through the hole 33 on the first directional rod 31 and the hole 34 on the corresponding second directional rod 32. The assembly of the first directional rod 31 and the corresponding second directional rod 32 is completed by matching the limiter 223 with the bottom plate 223. The hinge connection between the first directional rod 31 and the corresponding second directional rod 32 is achieved due to a fact that the first directional rod 31 and the corresponding second directional rod 32 can be rotated around the rod body 221

FIG. 1 shows the hinge connection of two groups of the first directional rods 31 and the second directional rods 32. In actual needs, multiple groups of the first directional rods 31 and the second directional rods 32 can be hinged to each other to form a network structure. When it is necessary to store or transport, the network structure is retracted by the principle of hinging, similar to a deformation process of a folding security door.

It should be noted that for simplicity, the embodiments are all expressed as a series of action combinations. However, those skilled in the art should be aware that the disclosure is not limited by the order of the described actions, as according to the disclosure, certain steps may be performed in other orders or simultaneously. Those skilled in the art should also be aware that the embodiments described in the specification are all preferred embodiments, and the actions and modules involved may not be necessary for the disclosure.

The above embodiments are only used to illustrate the technical solution of the disclosure, and not to limit the protection scope of the disclosure. Apparently, the described embodiments are only partial embodiments of the disclosure, not all embodiments. Based on the embodiments, all other embodiments obtained by those skilled in the art without creative labor fall within the scope of protection of the disclosure. Although detailed explanations are provided for the disclosure with reference to the embodiments, those skilled in the art can still combine, add, delete, or make other adjustments to the features in each embodiment of the disclosure accordingly without creative labor, to obtain different technical solutions that are essentially not detached from the concept of the disclosure. The technical solutions also belong to the scope of protection of the disclosure.

What is claimed is:

1. A retractable greening frame, comprising:
a connecting component (2), comprising: an upright column (21) and an insertion rod (22), wherein the upright column (21) is inserted in the insertion rod (22);
connecting rods (3), comprising: a plurality of first directional rods (31) and a plurality of second directional rods (32), wherein one of the plurality of first directional rod (31) is hinged to a corresponding one of the plurality of second directional rods (32) by the insertion rod (22); and
a decoration (1), comprising: a decorative component (11) and an installation ring (12), wherein the upright column (21) passes through the installation ring (12) to hold the installation ring (12) against an end surface of the insertion rod (22);
wherein the insertion rod (22) comprises a rod body (221), a bottom plate (222) and a limiter (223), the rod body (221) defines an insertion hole (23) inside, and the upright column (21) comprises a limiting end (211), a column body (212) and a cover plate (213);
wherein the limiter (223) protrudes from an outer wall of the rod body (221) and an inner wall of the rod body (221) surrounding the insertion hole (23), the limiter (223) is configured to limit the one of the plurality of first directional rods (31), the corresponding one of the plurality of second directional rods (32) and the limiting end (211); and
wherein an inner bottom surface of the limiter (223) protruding from the inner wall of the rod body (221) surrounding the insertion hole (23) is parallel to the connecting rods (3), a bottom surface of the limiting end (211) protruding from an outer wall of the column body (212) is parallel to the connecting rods (3), and the bottom surface of the limiting end (211) is in contact and flush with the inner bottom surface of the limiter (223) to make the upright column (21) be snap-fitted with the limiter (223) when the upright column (21) is inserted in the insertion rod (22).

2. The retractable greening frame as claimed in claim 1, wherein the limiting end (211) and the cover plate (213) are disposed at two ends of the column body (212) separately, and the end of the column body (212) provided with the limiting end (211) is inserted in the insertion rod (22).

3. The retractable greening frame as claimed in claim 2, wherein the bottom plate (222) and the limiter (223) are disposed at two ends of the rod body (221) separately, the end of the rod body (221) provided with the limiter (223) is an insertion end, the upright column (21) is inserted in the insertion rod (22) through the insertion end.

4. The retractable greening frame as claimed in claim 3, wherein the end of the upright column (21) provided with the limiting end (211) passes through the installation ring (12) before entering the rod body (221).

5. The retractable greening frame as claimed in claim 4, wherein when the limiting end (211) is snap-fitted with the rod body (221), a distance between the cover plate (213) and the end surface of the insertion rod (22) is same as a thickness of the installation ring (12).

6. The retractable greening frame as claimed in claim 3, wherein each of the plurality of first directional rods (31) and the plurality of second directional rods (32) defines a hole, and the rod body (221) passes through the one of the plurality of first directional rods (31) and the corresponding one of the plurality of second directional rods (32) through the hole (33) on the one first directional rod (31) and the hole (34) on the corresponding second directional rod (32); and the one first direction rod (31) and the corresponding one second direction rod (32) rotate at a part of the rod body (221) between the limiter (223) and the bottom plate (222).

7. The retractable greening frame as claimed in claim 1, wherein the decorative component (11) is an artificial plant.

8. The retractable greening frame as claimed in claim 3, wherein an outer diameter of the installation ring (12) is greater than a diameter of the insertion hole (23).

9. The retractable greening frame as claimed in claim 3, wherein a diameter of the cover plate (213) is greater than an outer diameter of the installation ring (12).

10. A retractable greening frame, comprising:
an upright column (21), comprising: a limiting end (211), a column body (212) and a cover plate (213), wherein the limiting end (211) and the cover plate (213) are disposed at two ends of the column body (212), respectively;
an insertion rod (22), comprising: a rod body (221), a bottom plate (222) and a limiter (223), wherein the bottom plate (222) and the limiter (223) are disposed at two ends of the rod body (221), respectively;
connecting rods (3), comprising: a first directional rod (31) and a second directional rod (32), wherein the first directional rod (31) is hinged to the second directional rod (32) by the insertion rod (22), the bottom plate (222) is located at a side of the second directional rod (32) facing away from the first directional rod (31), the limiter (223) is located at a side of the first directional rod (31) facing away from the second directional rod (32), and the rod body (221) penetrates the second directional rod (32) and the first directional rod (31);
an installation ring (12), located on the side of the first directional rod (31) facing away from the second directional rod (32) and abutted against the limiter (223) through the upright column (21);
wherein the limiting end (211) of the upright column (21) is inserted into the rod body (221) of the insertion rod (22) through the installation ring (12), and the cover plate (213) is located at a side of the installation ring (12) facing away from the first directional rod (31); and
a decorative component (11), connected to the installation ring (12);
wherein the rod body (221) defines an insertion hole (23) therein, the limiter (223) protrudes from an outer wall of the rod body (221) and an inner wall of the rod body (221) surrounding the insertion hole (23), the limiter (223) is configured to limit the first directional rod (31), the second directional rod (32) and the limiting end (211); and
wherein an inner bottom surface of the limiter (223) protruding from the inner wall of the rod body (221) surrounding the insertion hole (23) is parallel to the connecting rods (3), a bottom surface of the limiting end (211) protruding from an outer wall of the column body (212) is parallel to the connecting rods (3), and the bottom surface of the limiting end (211) is in contact and flush with the inner bottom surface of the limiter (223) to make the upright column (21) be snap-fitted with the limiter (223) when the upright column (21) is inserted in the insertion rod (22).

11. The retractable greening frame as claimed in claim 10, wherein the first directional rod (31) defines a hole (33) and the second directional rod (32) defines a hole (34), and the rod body (221) passes through the first directional rod (31) and the second directional rod (32) through the hole (33) on the first directional rod (31) and the hole (34) on the second directional rod (32).

12. The retractable greening frame as claimed in claim 1, wherein a part of an outer wall of the insertion rod (22) is provided with a sloping structure to be flush with the limiter (223).

13. The retractable greening frame as claimed in claim 12, wherein the cover plate (213), the installation ring (12), the limiter (223), the rod body (221), and the bottom plate (222) are sequentially stacked along a vertical direction perpendicular to the connecting rods (3).

14. The retractable greening frame as claimed in claim 10, wherein a part of an outer wall of the insertion rod (22) is provided with a sloping structure to be flush with the limiter (223).

15. The retractable greening frame as claimed in claim 14, wherein the cover plate (213), the installation ring (12), the limiter (223), the rod body (221), and the bottom plate (222) are sequentially stacked along a vertical direction perpendicular to the connecting rods (3).

\* \* \* \* \*